G. WILDS.
AEROPLANE.
APPLICATION FILED JULY 3, 1913.

1,106,020.

Patented Aug. 4, 1914.
6 SHEETS—SHEET 1.

Witnesses
Chas. W. Stauffiger
Anna M. Don.

Inventor
George Wilds,

By 
Attorneys

G. WILDS.
AEROPLANE.
APPLICATION FILED JULY 3, 1913.

1,106,020.

Patented Aug. 4, 1914.

Witnesses
Chas. W. Stauffiger
Anna M. Dorr.

Inventor
George Wilds,
By 
Attorneys

UNITED STATES PATENT OFFICE.

GEORGE WILDS, OF DETROIT, MICHIGAN.

AEROPLANE.

1,106,020. Specification of Letters Patent. Patented Aug. 4, 1914.

Application filed July 3, 1913. Serial No. 777,231.

*To all whom it may concern:*

Be it known that I, GEORGE WILDS, a citizen of the United States of America, residing at Detroit, in the county of Wayne and State of Michigan, have invented certain new and useful Improvements in Aeroplanes, of which the following is a specification, reference being had therein to the accompanying drawings.

In the construction of flying machines heavier than air, it is desirable that they be so arranged as to preserve their balance under normal weather conditions whether the motive power is operating or not. It is also advantageous that they be arranged as to lift readily from the ground under load.

This invention relates to a flying machine of the above type which is so arranged that it preserves its balance under normal weather conditions even when the motive power is shut off, that lifts readily from the ground under weight and that is so disposed that it may be readily converted into a hydro-plane or into a combination of hydro- and aero-plane.

Another feature of the invention is the arrangement whereby the machine is non-sinkable without the pontoons used in equatic work. Furthermore the pontoons are so disposed that if attached they may be moved into operative position and back again without disturbing the landing wheels so that the machine may be adapted for landing either on the surface of the water or on the ground at the option of the operator without special arrangement.

Other features in the disposition of the planes which provide for rapid flight as well as adjustment of the planes for different service conditions are included in the invention together with an arrangement of parts whereby the machine as a whole may be quickly fitted for shipment without dismantling.

The machine is also adapted for use as an ice boat or for propulsion on land if desired.

The invention consists in the matters hereinafter set forth and more particularly pointed out in the appended claims.

In general terms the invention consists of a main frame parallel to the line of flight on which the propelling machinery and controlling station of the operator are situated, the frame being equipped with landing wheels and pontoons together with a main plane substantially parallel to the frame and tiltable longitudinally thereon with a tail plane pivotally secured to the main plane to tilt longitudinally therewith on its own axis of oscillation together with wing or balance planes secured to the main plane and tiltable on the same axis as the latter. The tail plane is attached at its margins to rudder planes which are substantially horizontal or parallel to the main frame and are tiltable on axes substantially parallel to the line of flight of the machine.

As herein shown in preferred form, the main frame consists of a pair of booms 1 or spars which are made hollow for the purpose of lightness and buoyancy in case the machine drops into the water, interconnected by suitable cross members 2 with the necessary diagonal braces. Upright struts, preferably made of pairs of members 3 suitably interconnected are secured to the booms 1 with landing wheels 4 journaled suitably between their lower ends which are connected by a cross member 5. Rear landing wheels 6 are likewise journaled on depending posts 7 of suitable design, the posts and struts being braced by under stays 8 extending from the ends of the booms. A pivot rod 9 is secured across the upper ends of the members 3 and frame strips 10 of suitable design for strength and lightness and of conformation to give the desired curve to the main plane, are pivotally supported thereon to tilt longitudinally. The batten strips are connected by cross members 12 and at their rear ends are pivoted by means of a pin 13 to the slotted ends of batten strips 14 which themselves are fulcrumed on a cross bar 15 to the spars near the ends thereof as by upright members 16 with suitable braces or stays. A covering of flexible material is stretched over the batten strips to form the main plane and a similar covering is used over the tail batten strips, the tail covering being a continuation of the main plane covering or being closely lashed thereto at its margin. The slotted connection between the batten strips 14 and the pin 13 permit the elevation and depression of this joint as needed and this is accomplished preferably by a rod 19 pivoted at its upper end to the bar 13 and connected at its lower end to a crank pin 20 to a wheel 21 rotatable on the main plane and controlled by the operator through any suitable means.

At the ends of the pivot bar 9 wing booms 22 are pivotally connected to swing in any direction, their outer ends being supported by diagonally arranged cross members 23 leading to the main booms 1 and being stayed by suitable braces 48. The top stay 49 extending from end to end of the wing booms further stiffens them. A plurality of wing battens 24 of suitable design are pivotally supported between their ends on these wing booms 22 to support a covering indicated at 25 stretched over both sides of the strips and laced suitably as indicated at 26 along its inner margin to the marginal portion of the main plane. The outer portions of the wing covering are supported by leech ropes 27 preferably threaded through openings in the batten ends. At the extremities of the wings suitable tightening devices are employed for stretching the cover toward the end of the wing booms 22 as by means of the block and clamp indicated at 28 in any suitable manner. The contour shown is given the wings by suitable disposition and proportion of the successive batten strips 24 and by the extent of the tension imparted to the covering and the leech ropes, it being understood that the contour of the wings corresponds preferably, to the contour of the main plane so as to form a substantially unbroken continuation thereof.

Figure 8:
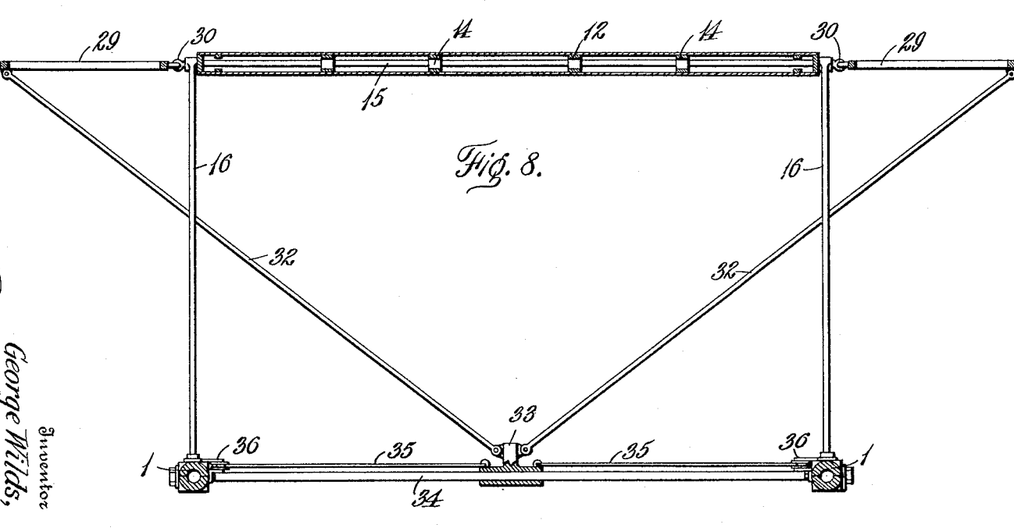
Fig. 8 is a view in transverse section, enlarged, showing the controlling mechanism of the steering planes of the machine.
Figures 9, 10:
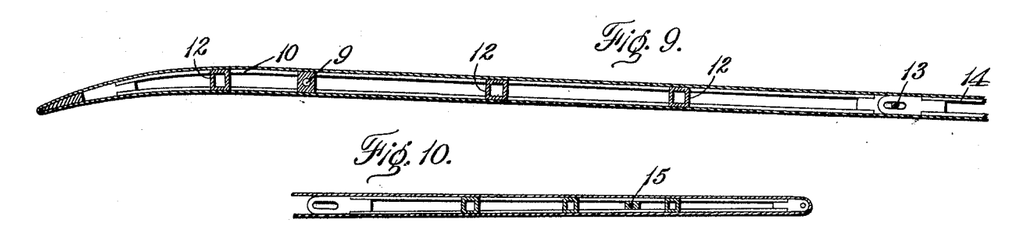
Fig. 9 is a view in detail of a member of a main frame and the connection thereto of a tail member.
Fig. 10 is a view in detail of a tail plane strip.

A pair of substantially horizontally oppositely disposed rudder planes are pivoted to each side of the tail plane. In preferred form these consist of suitably disposed frames indicated in Fig. 8 at 29 each pivoted at their inner edges as indicated at 30 to the margins of the tail plane. As a preferred means of operating these oppositely disposed planes to simultaneously depress one and raise the other, their outer margins are supported by brace rods 32 pivotally attached thereto at their upper ends, and at their inner ends to a block or fitting 33 that may be shifted transversely of the main frame on one of the transverse members 34 thereof by flexible connections 35 passing through lead blocks 36 to suitable controlling means at the operator's station.

Figure 11:
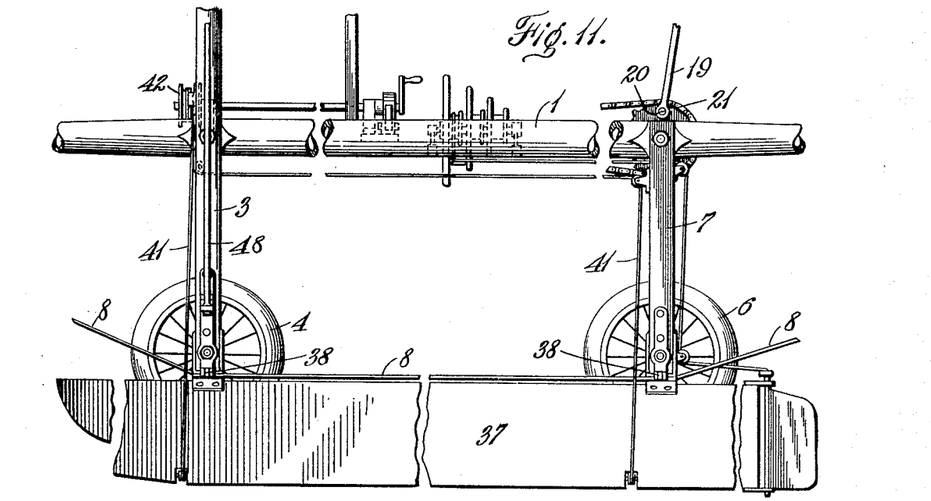
Fig. 11 is a view in side elevation, partially broken away and in detail, showing a machine equipped with pontoons together with adjusting means therefor.
Figure 12:
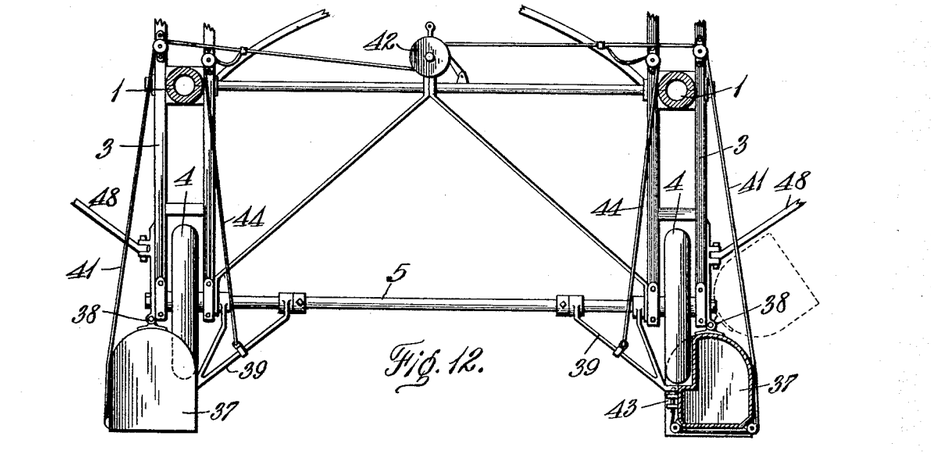
Fig. 12 is a view in cross section showing an arrangement of the pontoons whereby they may be swung clear of the landing wheels to allow use of the latter.

A pair of oppositely disposed pontoons indicated at 37 in Figs. 11 and 12 are severally hinged by suitable means indicated at 38 or the like to hang below the main booms 1 and landing wheels 4 and 6 when in operative position, besides being raised properly to clear the wheels. When in lowered position, the pontoons are braced by suitable means, as for example 39, pivoted to a cross member 40 between the main booms, the pontoons interlocking with the ends of the brackets when lowered. The pontoons may be swung up as indicated in Fig. 12, by suitable means, as for example flexible connections 41 passing over the suitable guide wheels or the like to a drum 42 within reach of the operator by which they may be taken up as desired. Preferably the flexible connections 41 also each trip a latch indicated at 43 which snaps into the bracket when the pontoons are lowered to hold the latter in position. The brackets may be raised as by suitable connections 44 leading to the operator's station.

A suitable motor indicated at 45 with propeller 46, operator's seat or station 47 and the usual controlling means complete the machine, these parts being so disposed that the center of gravity of the machine is below the main plane a considerable distance and is substantially under the center of effort of the planes. Furthermore the machine is so disposed that it maintains its balance without the operator aboard.

It is to be understood that the position of the engine and propeller together with the operator's station as herein indicated is not fixed as shown but may be shifted along the main booms in any way suitable to bring the center of gravity in the position indicated. It is further to be understood that the various stays and braces are secured with take-up and expansion members whereby the required strain may be put upon the planes to bring them into the desired shape, the flexible leeches of the wings permitting the latter to be curved into the form found best adapted for the conditions of service.

Figure 1:
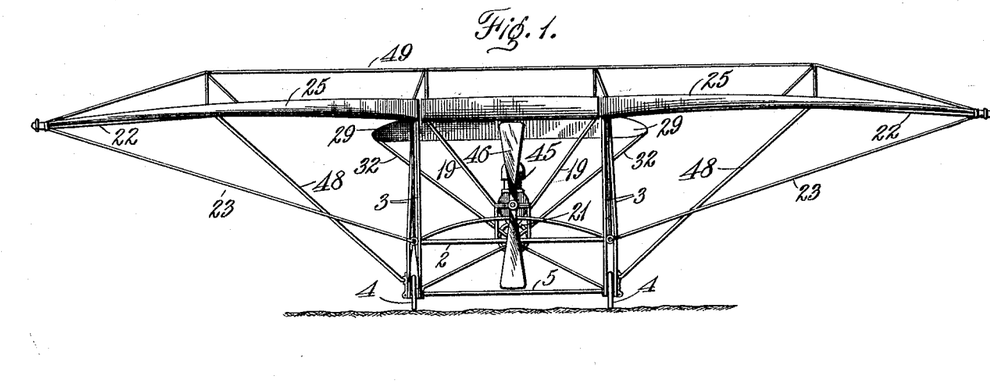
Figure 1 is a view in front elevation of a machine that embodies features of the invention with portions of the controlling mechanism omitted.
Figure 2:
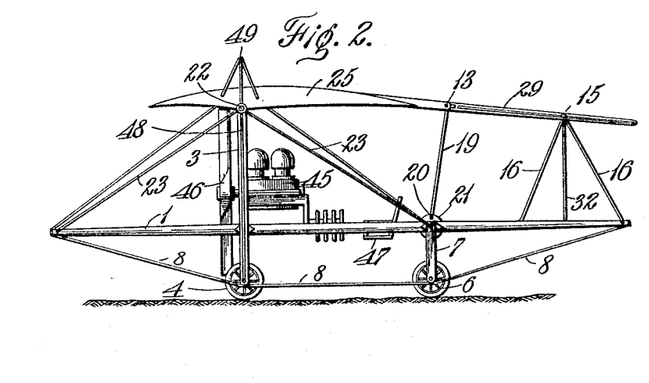
Fig. 2 is a view in side elevation of the machine.
Figure 3:
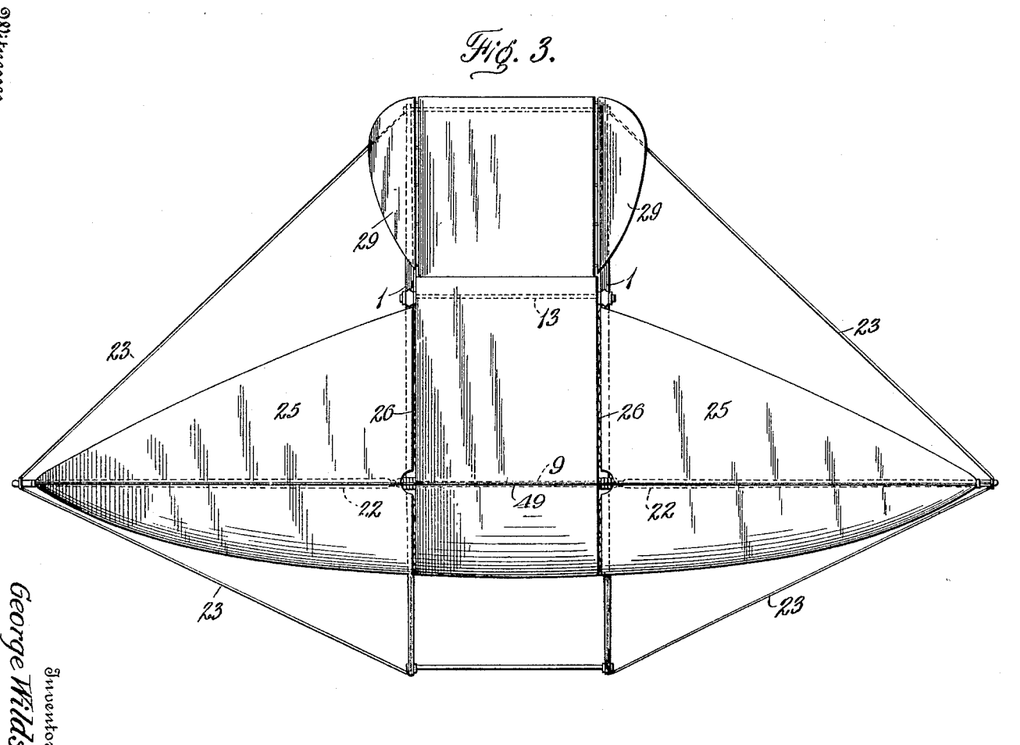
Fig. 3 is a plan view showing the disposition of the planes and general arrangement of the machine.
Figure 4:
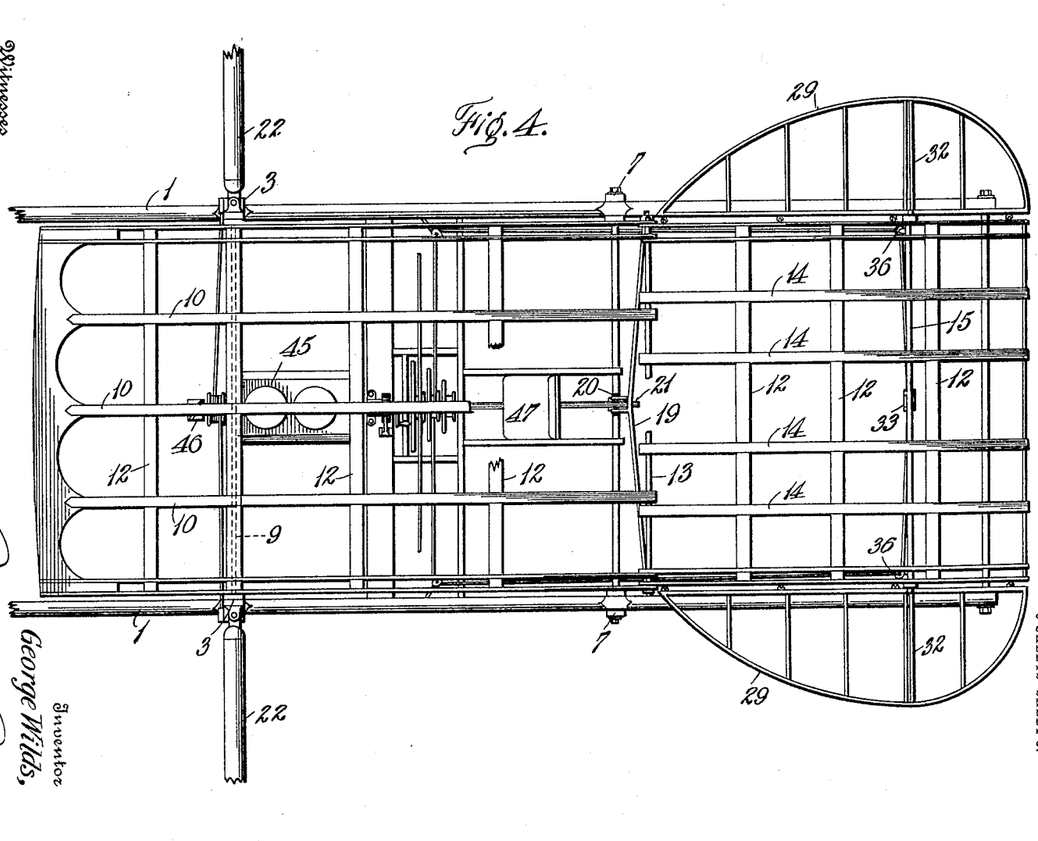
Fig. 4 is a plan view, enlarged, of the main frame of the machine and the frames of the planes, the fabric of the latter being removed.
Figures 5, 6, 7:
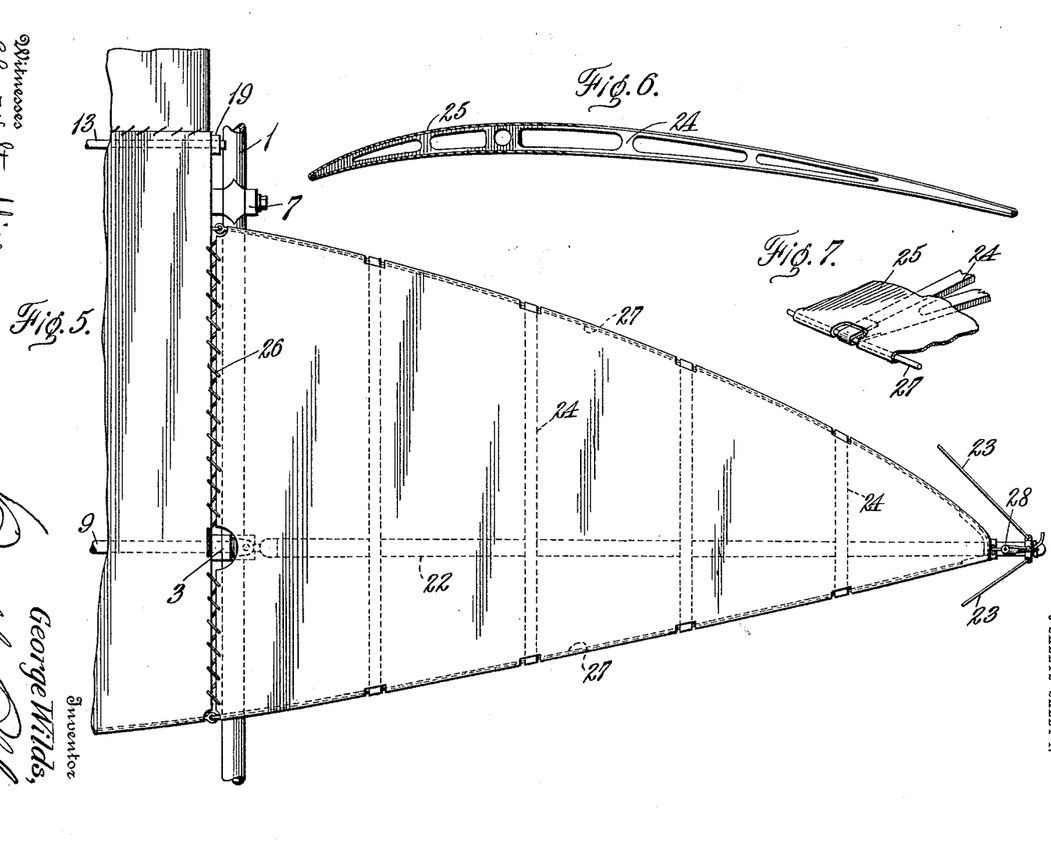
Fig. 5 is an enlarged view in detail of a side plane of the machine.
Fig. 6 is a view in detail of a batten of one of the planes.
Fig. 7 is a view in detail showing the connection of the end of a batten strip to a leech rope, with an adjacent portion of the membrane or skin of the plane.

In operation, the machine before starting flight and while on the ground may have the planes in substantially the positions indicated, longitudinally, in Fig. 2, with the rudder planes in substantially the same position as the tail plane while the wings may be raised above or below the main plane. After the machine has acquired impetus on the ground the operator by manipulation of the stay 19 depresses the joint margins of the main and tail planes and concurrently therewith tilts the wings so that the latter coöperate with the body planes to raise the head of the machine from the ground, the reverse inclination of the tail plane assisting in this regard. As the desired altitude is reached the planes may be returned to the position indicated in Fig. 2. In order to change the direction of flight the rudder planes 29 may be oppositely tilted in one direction or the other with the result that the machine careens and swings in the direction of the uptilted plane. It is further a result of this construction that when the motive power is shut off, the balance of the machine allows the latter to remain without tilting, so that it may glide readily to the ground under proper manipulation. Furthermore because of the flexibility of the planes due to their axes of motion, it is found, that under certain favorable conditions of weather the machine may be careened laterally after the power is shut off and be made to soar and pursue its flight without the use of the motive power due to the resultant between the action of gravity and the pressure of the wing under the planes.

As indicated, the pontoons may be added or detached at will and when so added may be swung out of the way to permit landing upon the bearing wheels or may be dropped to allow landing upon water. If the pontoons are so detached, the hollow spars and booms forming the frame-work are sufficiently buoyant to float the machine. As a further detail of construction and as an advantage of the device, the pivotal attachment of the wing booms permits the unhooking of the stays, the removal of the wings and the folding back against the body frame of these members for transportation upon the deck of a vessel or the like. By proper proportioning of the leeches of the wings, and by tension of the stays of the wing booms together with the conformation of the covering of the wings, the latter may be given any desired shape. Furthermore the machine may be provided with different sets of wings which are interchangeable so that the machine can be readily fitted without dismantling for any service required. As there are no vertical planes but merely horizontally disposed laterally tiltable rudders, the machine is capable of great speed as there is little resistance to passage through the air.

Obviously, changes in the details of construction may be made without departing from the spirit of my invention and I do not care to limit myself to any particular form or arrangement of parts.

What I claim is:—

1. A flying machine comprising a main frame disposed longitudinally in the line of flight of the machine, a main plane at an interval above the frame with wing planes forming lateral extensions thereof, oscillatory on a main axis transverse to the frame, the wings being independently adjustable angularly on axes transverse to the main axis, a tail plane articulated to the main plane as an extension thereof and pivoted on an axis parallel to the main axis, means for propelling the machine mounted on the frame, and means for manipulating the planes from an operator's station on the frame.

2. A flying machine comprising a main frame disposed longitudinally in the line of flight of the machine, a main plane at an interval above the frame with wing planes forming lateral extension thereof, oscillatory on a main axis transverse to the frame, the wings being independently adjustable angularly on axes transverse to the main axis, a tail plane articulated to the main plane as an extension thereof and pivoted on an axis parallel to the main axis, means for propelling the machine mounted on the frame, and means for manipulating the planes from an operator's station on the frame, the center of gravity of the machine lying below the planes and substantially in vertical alinement with the center of effort of the planes.

3. A flying machine comprising a main frame disposed longitudinally in the line of flight of the machine, a main plane at an interval above the frame oscillatory on a main axis transverse to the frame, wing planes articulated along their inner margins to the main plane as lateral extensions thereof and tiltable on the main axis with said plane, the wings being independently adjustable angularly on axes transverse to the main axis, a tail plane pivoted on an axis transverse to the main frame and articulated at its forward end to the rear end of the main plane as an extension thereof, means mounted on the main frame for propelling the machine, and means for manipulating the planes from an operator's station on the main frame.

4. A flying machine comprising a main frame disposed longitudinally in the line of flight of the machine, a main plane substantially parallel to the main frame at an interval thereover and angularly movable on an axis transverse to the main frame, wing planes forming lateral extensions of the main plane to which they are articulated to tilt on the same axis of motion, the wings being likewise adjustable angularly on axes transverse to the axis of motion of the main plane, and a tail plane forming an extension of the main plane to which it is articulated and swinging on an axis parallel to the axis of motion of the main plane, the center of effort of the planes being above and substantially in vertical alinement with the center of gravity of the planes.

5. A flying machine comprising a main frame and a substantially unbroken mono-plane secured at an interval above the frame, said mono-plane comprising a main plane that is tiltable on an axis transverse to the frame, wings forming lateral extensions of the main plane likewise tiltable on the same axis and independently adjustable angularly on axes transverse to said axis, a tail plane tiltable on an axis parallel to the axis of motion of the main plane, rudder planes forming lateral extensions of the tail plane and swinging on axes substantially co-incident with the margins of the tail plane, and means for manipulating the planes.

6. A flying machine comprising a main frame disposed longitudinally in the line of flight of the machine, a main plane pivotally supported at an interval above the frame on a main axis transverse to the frame, wings forming lateral extensions of the main plane and adapted to swing on an axis co-axial with the axis of the main plane, the wings being independently adjustable angularly on axes transverse to the axis of the main plane, a tail plane tiltable on an axis parallel to the axis of the main plane and articulated to the latter, rudder planes forming oppositely disposed lateral extensions of the tail plane and movable on axes transverse to the axis of the main plane, said planes forming a substantially unbroken mono-plane, means for propelling the machine mounted on the frame, and means for controlling the planes from a station on the main frame.

7. A flying machine comprising a main frame of buoyant material disposed longitudinally in the line of flight of the machine, a main plane disposed longitudinally of the main frame at an interval above the latter and adapted to tilt on a main axis transverse to the frame, a pair of oppositely disposed wing planes forming lateral extensions of the main plane to the margins of which they are connected and adapted to swing on an axis co-axial with the axis of the main plane, the wing planes being angularly adjustable on an axis transverse to the main axis, a tail plane articulated to the rear end of the main plane and pivoted on an axis parallel to the main axis, rudder planes forming lateral extensions of the tail plane and swinging on axes transverse to the main axis, and means operable from a station on the main frame for manipulating the planes.

8. A flying machine comprising a main frame disposed longitudinally in the line of flight of the machine, a main plane pivotally secured thereon at an interval above the plane on an axis transverse to the frame, wings forming lateral extensions of the main plane and adapted to swing on the axis thereof, the wings being independently adjustable angularly on axes transverse to the axis of the main plane, a tail plane forming an extension of the main plane and adapted to swing on an axis parallel to the axis of the main plane, rudder planes forming lateral extensions of the tail plane and swingable on axes transverse to the axis of the main plane, means operable from a point on the main frame for manipulating the planes, means on the main frame for propelling the machine, landing wheels mounted on the main frame and pontoons adjustably mounted on the main frame and adapted when in operative position to extend below the landing wheels.

9. A flying machine comprising a main frame disposed longitudinally in the line of flight of the machine, a main plane pivotally secured to the main frame at an interval above the latter to tilt on an axis transverse to the frame, wings each articulated at their inner ends to the lateral margins of the main frame on which they form lateral extensions and pivotally supported on the main frame to tilt with the main plane on its axis, a tail plane articulated at its inner end to the rear end of the main plane and pivotally supported on the main frame to tilt on an axis parallel to the axis of the main plane, rudder planes articulated at their inner margins to the lateral margins of the tail plane adapted to move independently or co-incidentally with the tail plane, a vertically adjustable strut supporting the articulated margins of the main and tail planes, means for shifting the strut, means for securing the wings in adjusted position, and means for simultaneously depressing one rudder plane and elevating the other.

10. In a flying machine, a main frame disposed longitudinally to the line of flight of the machine, a main plane pivotally supported at an interval above the frame on a main axis transverse to the frame, a tail plane articulated to and forming an extension of the main plane and swinging on an axis parallel to the main axis, and means for raising and depressing the articulated margins of the planes from an operator's station on the frame.

11. In a flying machine a main frame disposed longitudinally in the line of flight of the machine, a main plane pivotally mounted above the frame on a main axis transverse to the frame, a tail plane forming an extension of the main plane and pivoted on an axis parallel to the main axis, a strut member supporting the connected margins of the main and tail planes, and means for raising and lowering the strut member adapted to be operated from a station on the main frame.

12. In a flying machine, a main frame, a pair of upright struts thereon, a pivot rod on the struts transverse to the main frame, a main plane pivoted on the rod, wing booms pivotally connected to the ends of the pivot bar and supported at their outer ends by brace and stay members of the main frame adjustable for securing the booms in desired angular relation to the pivot rod, and wing planes forming lateral extensions of the main plane and tilting therewith on the booms.

13. In a flying machine, a main frame, upright supports thereon, a pivot rod mounted on the supports transversely to and above the frame, a main plane frame-work pivoted between its ends on the pivot rod and provided with a covering, wing booms pivotally supported at their inner ends to the main frame in alinement with the pivot rod, detachable stay members on the main frame securing the outer ends of the booms in adjusted position, the booms being adapted to swing against the main frame when disconnected from the stay members, wing batten strips pivoted between their ends on the booms in spaced relation and connected at their extremities with leech ropes, a covering for each set of wing battens connected to the margins of the covering of the main plane frame to form substantially flush continuations thereof, and manually operable means for tilting the plane and wings on the pivot rod and booms.

14. In a flying machine, a main frame, upright supports thereon, a transversely disposed pivot rod on the supports above the main frame, a cross bar secured on the supports of the main frame back of and parallel to the pivot rod, a main plane pivoted between its ends on the rod, a tail plane pivoted between its ends on the cross bar and articulated to the main plane to form a substantially unbroken continuation thereof, and a vertically adjustable strut supporting the connected ends of the main and tail planes for raising and depressing them.

15. In a flying machine, a main frame disposed longitudinally in the line of flight of the machine, a pivot rod mounted transversely at an interval above and near the forward portion of the frame, a cross bar mounted at an interval above the rear portion of the frame parallel to the pivot rod, a main plane pivoted between its ends on the rod, a tail plane pivoted between its ends on the bar, the adjacent ends of the planes being articulated, manually operable means on the main frame for raising and depressing the articulated ends of the planes, a pair of rudder planes articulated to the lateral margins of the tail plane as lateral extensions thereof, and means for simultaneously depressing either rudder plane and raising the companion plane, the rudder planes yielding longitudinally with the tail plane.

16. In a flying machine, a main frame disposed longitudinally to the line of flight of the machine, a main plane pivotally supported at an interval above the frame on a main axis transverse to the frame, a tail plane articulated to and forming an extension of the main plane and swinging on an axis parallel to the main axis, means for raising and depressing the articulated margins of the planes from an operator's station on the frame, and rudder planes articulated to the lateral margins of the tail plane as lateral extensions thereof and adapted to be tilted longitudinally therewith.

17. In a flying machine, a main frame, a tail plane pivotally supported between its ends on an axis transverse to the main frame and at an interval above the latter, a pair of oppositely disposed rudder planes articulated to the lateral margins of the tail plane to move on the latter's axis of motion, brace rods each pivotally attached at its outer end to a rudder plane to support the latter, and a fitting reciprocable transversely on the main frame to which the inner ends of the brace rods are connected.

18. A flying machine, a main frame disposed longitudinally in the line of flight of the machine, upright supports near the forward end of the machine, a transversely disposed pivot rod secured on the supports at an interval above the frame, a main plane pivotally supported between its ends on the pivot rod, a pair of booms articulated at their inner ends to the main plane and adjustably supported at their outer ends by members of the frame, upright supports near the rear of the main frame, a cross bar secured thereon at an interval above the main frame in parallel relation to the pivot rod, wing frames each pivoted on a boom articulated at its inner end to the main plane, a tail plane pivoted on the cross bar between its ends and articulated at its forward ends to the rear end of the main plane as a continuation thereof, a reciprocable strut member for raising and depressing the connected ends of the main and tail planes, a pair of oppositely disposed rudder planes articulated along their inner margins to the tail plane as lateral extensions thereof and adapted to tilt therewith, a pair of convergent brace members each pivoted at its outer end to a rudder plane for supporting the latter, and a fitting reciprocable transversely on the main frame to which the inner ends of the brace members are secured.

19. In a flying machine, a main frame, a main plane pivoted on an axis transverse to the frame to tilt longitudinally, and wing planes each consisting of a boom pivotally secured at the inner end to the main frame in alinement with the axis of the main plane, brace members supporting the outer ends of the boom, adjustable to vary the position thereof, wing batten strips slidable and tiltable on the booms, a leech rope rove through the extremities of the strips, a flexible covering enveloping the strips and leech rope, and means at the extremity of the boom for drawing the leech rope and covering taut.

In testimony whereof I affix my signature in presence of two witnesses.

GEORGE WILDS.

Witnesses:
C. R. STICKNEY,
A. M. DORR.

Copies of this patent may be obtained for five cents each, by addressing the "Commissioner of Patents. Washington, D. C."